(12) United States Patent
Lee

(10) Patent No.: US 11,179,844 B2
(45) Date of Patent: Nov. 23, 2021

(54) ROBOT AND METHOD FOR LOCALIZING ROBOT

(71) Applicant: LG ELECTRONICS INC., Seoul (KR)

(72) Inventor: Hak Joo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 16/654,133

(22) Filed: Oct. 16, 2019

(65) Prior Publication Data

US 2020/0047330 A1 Feb. 13, 2020

(30) Foreign Application Priority Data

Sep. 6, 2019 (KR) .................. 10-2019-0111017

(51) Int. Cl.
*B25J 19/02* (2006.01)
*B25J 9/02* (2006.01)
*B25J 9/16* (2006.01)
*B25J 13/08* (2006.01)

(52) U.S. Cl.
CPC ............... *B25J 9/02* (2013.01); *B25J 9/1664* (2013.01); *B25J 13/08* (2013.01)

(58) Field of Classification Search
CPC . B25J 9/02; B25J 9/1664; B25J 13/08; G05D 1/0088; G05D 1/0234; G05D 2201/0207

USPC ................................... 700/245, 258
See application file for complete search history.

(56) References Cited

U.S. PATENT DOCUMENTS

| 2014/0342834 A1* | 11/2014 | Tappeiner ............. A63H 30/02 463/42 |
| 2016/0146934 A1* | 5/2016 | Chawla ................... G01S 13/74 342/458 |
| 2016/0267755 A1* | 9/2016 | Martinson ............... G08B 6/00 |
| 2018/0067187 A1* | 3/2018 | Oh ......................... G01S 5/0242 |

FOREIGN PATENT DOCUMENTS

KR 10-2017-0034069 3/2017

* cited by examiner

*Primary Examiner* — Dalena Tran
(74) *Attorney, Agent, or Firm* — KED & Associates LLP

(57) ABSTRACT

A robot and a method for localizing a robot are disclosed. A method for location recognition of a robot includes moving in space; identifying a dot code disposed at a bottom of the space; and determining a location and direction of the robot based on the identified dot code. The dot code includes at least two reference dots arranged to indicate a reference direction. Embodiments of the present disclosure may be implemented by executing artificial intelligence algorithms and/or machine learning algorithms in a 5G environment connected for the Internet of Things.

17 Claims, 13 Drawing Sheets

ROBOT AND METHOD FOR LOCALIZING ROBOT

CROSS-REFERENCE TO RELATED APPLICATION

This application claims the benefit of priority to Korean Application No. 10-2019-0111017, entitled "ROBOT AND METHOD FOR LOCALIZING ROBOT," filed on Sep. 6, 2019, in the Korean Intellectual Property Office, the entire disclosure of which is incorporated herein by reference.

BACKGROUND

1. Technical Field

The present disclosure relates to a robot, and more particularly, to localization of a robot.

2. Description of Related Art

Recently, robots that can be conveniently used in daily life have been actively developed. Such robots are being used to help people in their daily lives in homes, schools and public places.

Mobile robots such as guide robots, delivery robots, and cleaning robots perform tasks while driving autonomously without the manipulation of a user. For a robot to drive autonomously, localization of the robot is necessary. According to the related art, a current location of the robot can be recognized using a map of an environment in which the robot operates, and various sensor data.

However, when an unexpected movement of the robot occurs (for example, when the user moves the robot to an arbitrary location, or when a robot that ran out of battery starts up again at an arbitrary location), the robot may be unable to properly recognize its current location or direction. If the robot does not know its current location or direction, it cannot provide the desired service.

Korean Patent Application Publication No. 10-2017-0034069 discloses a method of recognizing a relative location of a mobile robot with respect to a local map. Here, when the user moves a mobile robot to an arbitrary location, the mobile robot scans its surrounding to obtain a local map. Moreover, data of a real sensor is acquired while the mobile robot rotates. In the method described above, matching between the local map and the data is performed to recognize a relative location of the mobile robot with respect to the local map.

However, in order to use such an algorithm, expensive sensors, such as a lidar sensor, which can accurately measure the distance with respect to a nearby object, are required. In addition, the disclosed algorithm has limited application to mobile robots operated in a wide open space or a space in which surrounding structures are hard to distinguish.

SUMMARY OF THE INVENTION

An aspect of the present disclosure provides methods for quickly and effectively recognizing a robot's location or direction when an unexpected movement occurs in the robot.

Another aspect of the present disclosure provides methods capable of effectively recognizing the location or direction of the robot at low cost.

Another aspect of the present disclosure provides methods for recognizing the current location or direction of the robot without depending on the surrounding structures.

Another aspect of the present disclosure provides methods that allow a robot in normal operation to effectively correct its location or orientation.

Another aspect of the present disclosure provides methods for recognizing the location or direction of a robot and executing operations corresponding to the location.

Embodiments of the present disclosure are not limited to solving the above-described problems, and other aspects and advantages of the present disclosure can be appreciated by those skilled in the art based on the following description and will be understood more clearly from embodiments of the present disclosure. Moreover, aspects and advantages of the present disclosure may be realized by the means and combinations thereof indicated in claims.

The robot and the method for recognizing the location of the robot according to an embodiment of the present disclosure are configured to identify the dot code disposed at the bottom of the space and determine the location and direction of the robot based on the identified dot code. The dot code may include at least two reference dots arranged to indicate the reference direction.

According to an embodiment of the present disclosure, a method for localization of a robot includes moving in space, identifying a dot code disposed at a bottom of the space, and determining a location and direction of the robot based on the identified dot code, and the dot code includes at least two reference dots arranged to indicate a reference direction.

The determining of the location and direction of the robot includes determining coordinates corresponding to pattern information of the identified dot code as a location of the robot and determining a direction of the robot based on an angle between a direction in which the dot code is identified and the reference direction.

The method may further include, in response to identifying the dot code, executing one or more operations corresponding to the pattern information of the identified dot code.

The one or more operations may include at least one of moving in the reference direction, outputting a preset guide voice, or changing a setting of the robot.

The reference direction may indicate a location of a charging station.

The moving in the space may include moving along a path of a predetermined pattern to identify the dot code.

The path of the predetermined pattern may include a spiral path.

The at least two reference dots may be arranged to form a sign indicating the reference direction.

The dot code may be composed of a group of identical dot codes corresponding to the same coordinates.

At least one of the dot codes in the group may protrude toward the reference direction.

The dot codes in the group may be arranged to form a sign indicating the reference direction.

According to an embodiment of the present disclosure, a robot includes a driver configured to move the robot in space, an optical sensor configured to identify a dot code disposed at a bottom of the space, and at least one processor configured to determine a location and direction of the robot based on a dot code identified by the optical sensor, and the dot code includes at least two reference dots arranged to indicate a reference direction.

The at least one processor may determine coordinates corresponding to pattern information of the identified dot code as a location of the robot, and determine a direction of the robot based on an angle between a direction in which the dot code is identified and the reference direction.

The at least one processor may execute one or more operations corresponding to the pattern information of the identified dot code in response to identifying the dot code, and the one or more operations may include at least one of moving in the reference direction, outputting a preset guide voice, or changing a setting of the robot.

The at least one processor may control the driver to move the robot along a path of a predetermined pattern to identify the dot code.

The path of the predetermined pattern may include a spiral path.

According to an embodiment of the present disclosure, a robot system includes a plurality of different dot codes disposed at a bottom of a space, and at least one robot configured to provide a service in the space, and the at least one robot is configured to identify any one dot code among the plurality of dot codes, determine its location and direction based on the identified dot code, and provide the service based on the determined location and direction, and each of the dot codes includes at least two reference dots arranged to indicate a reference direction.

The at least one robot may determine coordinates corresponding to the pattern information of the identified dot code as its location, and determine its direction based on an angle between a direction in which the dot code is identified and the reference direction.

The at least one robot may execute one or more operations corresponding to the pattern information of the identified dot code in response to identifying the dot code, and the one or more operations may include at least one of moving in the reference direction, outputting a preset guide voice, or changing its setting.

The reference direction may indicate a location of a charging station.

According to embodiments of the present disclosure, even in the event of an unexpected movement of a robot, the robot may recognize its location or direction quickly and effectively.

In addition, a robot not having a relatively expensive sensor may effectively recognize its current location or direction.

Further, a robot may recognize its current location or direction without depending on surrounding structures.

Furthermore, a robot in a normal driving state may effectively correct its current location or direction.

According to the embodiments of the present disclosure, the robot recognizes its location or direction and simultaneously executes operations corresponding to the location.

Effects of the present disclosure are not limited to the above-mentioned effects, and other effects, not mentioned above, will be clearly understood by those skilled in the art from the description of claims.

DETAILED DESCRIPTION

Figure 1:
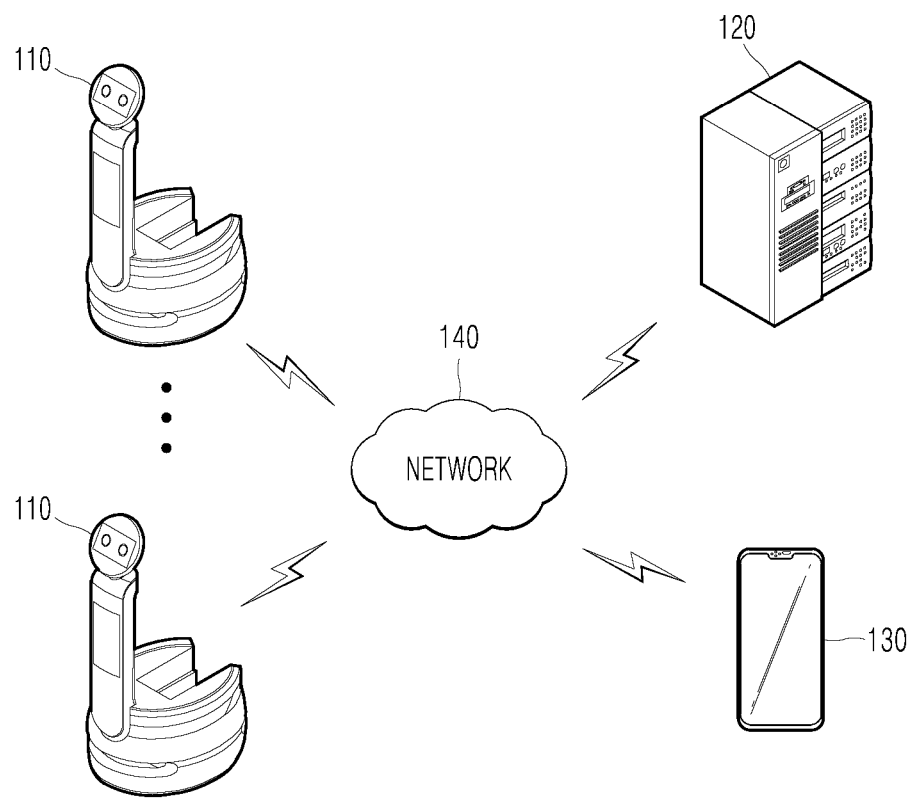
FIG. 1 is a view of a robot system according to an embodiment of the present disclosure.

In what follows, embodiments disclosed in this document will be described in detail with reference to appended drawings, where the same or similar constituent elements are given the same reference number irrespective of their drawing symbols, and repeated descriptions thereof will be omitted. In the following description, the terms "module" and "unit" for referring to elements are assigned and used exchangeably in consideration of convenience of explanation, and thus, the terms per se do not necessarily have different meanings or functions. Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

It will be understood that, although the terms "first", "second", and the like may be used herein to describe various elements, these elements should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

A robot may refer to a machine which automatically handles a given task by its own ability, or which operates autonomously. In particular, a robot having a function of recognizing an environment and performing an operation according to its own judgment may be referred to as an intelligent robot.

Robots may be classified into industrial, medical, household, and military robots, according to the purpose or field of use.

A robot may include an actuator or a driver including a motor in order to perform various physical operations, such as moving joints of the robot. Moreover, a movable robot may include, for example, a wheel, a brake, and a propeller in the driver thereof, and through the driver may thus be capable of traveling on the ground or flying in the air.

Autonomous driving is a self-driving technology, and an autonomous vehicle is a vehicle that moves without any manipulation by a user or with minimum manipulation by a user.

For example, autonomous driving may include all of a technology for keeping a driving lane, a technology for automatically controlling a speed such the an adaptive cruise control, a technology for automatically driving a vehicle along a determined path, and a technology for, if a destination is set, automatically setting a path and driving a vehicle along the path.

A vehicle includes a vehicle having only an internal combustion engine, a hybrid vehicle having both an internal combustion engine and an electric motor, and an electric vehicle having only an electric motor, and may include not only an automobile but also a train and a motorcycle.

In this case, an autonomous vehicle may be considered as a robot with an autonomous driving function.

FIG. 1 is a view of a robot system according to an embodiment of the present disclosure. Referring to FIG. 1, the robot system according to an embodiment of the present disclosure may include one or more robots 110 and a control server 120, and may further include a terminal 130.

The one or more robots 110, the control server 120, and the terminal 130 may be connected to each other through a network 140. The one or more robots 110, the control server 120, and the terminal 130 may communicate with each other through a base station, but may directly communicate with each other without passing through a base station.

The one or more robots 110 may perform a task in a space and provide information or data related to the task for the control server 120. A workspace of a robot may be indoors or outdoors. A robot may be operated in a predefined space by a wall or a column. In this case, a workspace of a robot may be defined in various ways depending on the design purpose, working attributes of the robot, mobility of the robot, and other factors. A robot may be operated in an open space, which is not predefined. The robot may also sense a surrounding environment and determine a workspace by itself.

The one or more robots 110 may provide its state information or data for the control server 120. The state information of the robot 110 may include information on the location of the robot 110, a battery level, durability of parts, replacement cycles of consumables, and the like.

The control server 120 may perform various analysis based on information or data provided by the one or more robots 110, and control an overall operation of a robot system based on the analysis result. In an aspect, the control server 120 may directly control driving of the robot 110 based on the analysis result. In another aspect, the control server 120 may derive and output useful information or data from the analysis result. In still another aspect, the control server 120 may adjust parameters in a robot system using the derived information or data. The control server 120 may be implemented as a single server, but may be implemented as a plurality of server sets, a cloud server, or a combination thereof.

The terminal 130 may share the role of the control server 120. In an aspect, the terminal 130 may obtain information or data from the one or more robots 110 and provide the information or data for the control server 120, or may obtain information or data from the control server 120 and provide the information or data for the one or more robots 110. In another aspect, the terminal 130 may share at least a portion of analysis to be performed by the control server 120, and may provide a result of the analysis for the control server 120. In still another aspect, the terminal 130 may receive an analysis result, information, or data from the control server 120, and may simply output the analysis result, information, or data.

The terminal 130 may share the role of the control server 120. In another embodiment, at least one robot of a plurality of robots 110 may replace the control server 120. In this case, the plurality of robots 110 may be connected to communicate with each other.

The terminal 130 may include various electronic devices capable of communicating with the robot 110 and the control server 120. The terminal 130 may be implemented as a stationary terminal and a mobile terminal, such as a mobile phone, a projector, a mobile phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, and digital signage.

The network 140 may refer to a network which configures a portion of a cloud computing infrastructure or which is provided in a cloud computing infrastructure. The network 140 may be, for example, a wired network such as local area networks (LANs), wide area networks (WANs), metropolitan area networks (MANs), or integrated service digital networks (ISDNs), or a wireless communications network such as wireless LANs, code division multiple access (CDMA), wideband CDMA (WCDMA), long term evolution (LTE), long term evolution-advanced (LTE-A), 5G (generation) communications, Bluetooth™, or satellite communications, but is not limited thereto.

The network 140 may include connection of network elements such as hubs, bridges, routers, switches, and gateways. The network 140 can include one or more connected networks, for example, a multi-network environment, including a public network such as an internet and a private network such as a safe corporate private network. Access to the network 140 may be provided through one or more wire-based or wireless access networks. Further, the network 140 may support various types of machine-to-machine (M2M) communications (for example, Internet of Things (IoT), Internet of Everything (IoE), Internet of Small Things (IoST)), transmitting and receiving information between distributed components such things to process the information, and/or 5G communications.

When an unexpected movement of the robot 110 occurs (for example, when the user moves the robot 110 to an arbitrary location, or when the robot 110 that ran out of battery starts up again at an arbitrary location), the robot 110 may be unable to properly recognize its current location or direction. The robot 110 may recognize its location by deriving a distance from surrounding structures using a LiDAR sensor or a camera. However, there is a limit to application of such a technique in a space in which it is difficult to distinguish the surrounding structures.

Embodiments of the present disclosure are to provide a method for the robot 110 to recognize the dot code disposed on the floor thereby quickly and effectively recognizing its location and direction.

Figure 2:
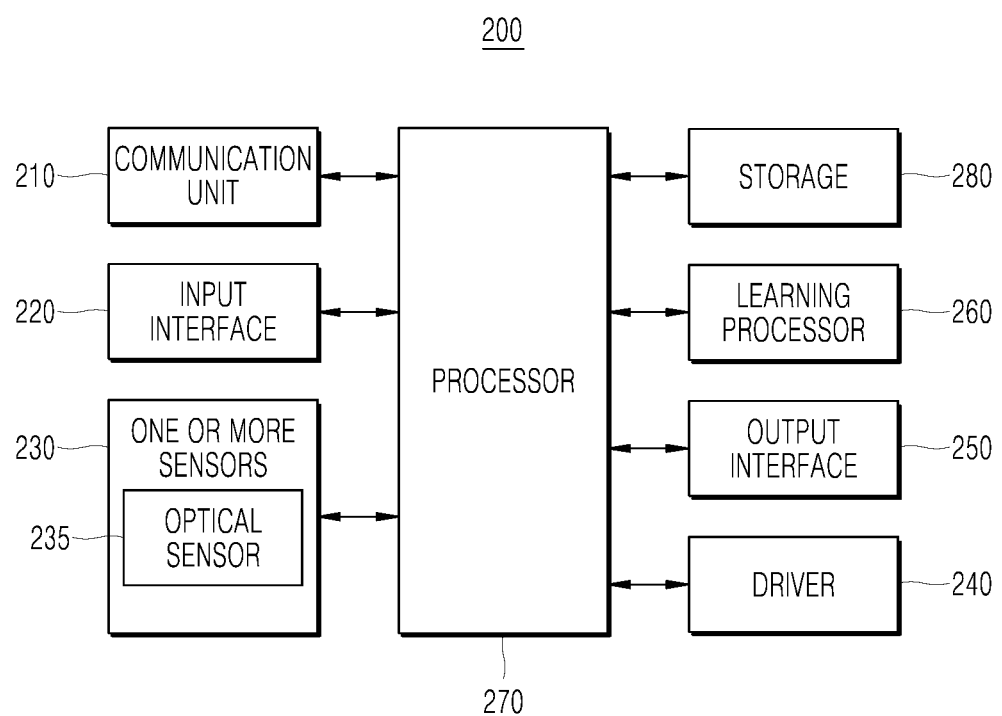
FIG. 2 is a block diagram illustrating a configuration of a robot according to an embodiment of the present disclosure.

FIG. 2 is a block diagram illustrating a configuration of a robot according to an embodiment of the present disclosure;

Referring to FIG. 2, the robot 200 according to an embodiment of the present disclosure includes a communication unit 210, an input interface 220, one or more sensors 230, a driver 240, an output interface 250, and a processor 270, and a storage 280. The one or more sensors 230 may include an optical sensor 235. The robot 200 may further include a learning processor 260 to perform an operation related to artificial intelligence and/or machine learning.

The communication unit 210 may transmit or receive information or data with external devices such as the control server 120 or the terminal 130 using wired or wireless communication technology. The communication unit 210 may transmit/receive sensor information, a user input, a learning model, a control signal, and the like with external devices. The communication unit 210 may include a communicator for transmitting and receiving data, such as a receiver, a transmitter, or a transceiver.

The communication unit 210 may use communication technologies such as Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), Wireless LAN (WLAN), Wireless-Fidelity (Wi-Fi), Bluetooth™, Radio Frequency Identification (RFID), Infrared Data Association (IrDA), ZigBee, Near Field Communication (NFC), Visible Light Communication, Light Fidelity (Li-Fi), and the like.

The communication unit 210 may communicate with external devices such as the control server 120 and the terminal 130 using at least one service of Enhanced Mobile Broadband (eMBB), Ultra-reliable and low latency communications (URLLC), and Massive Machine-type communications (mMTC).

Enhanced Mobile Broadband (eMBB) is a mobile broadband service. Multimedia content, wireless data access, and the like are provided by eMBB. Further, the eMBB may also provide enhanced mobile services such as a hot spot and a broadband coverage to cover the mobile traffic which is explosively increased. A large quantity of traffics may be accommodated in a region with less user mobility and higher density through the hot spot. Through broadband coverage, a wide-range and stable wireless environment and user mobility may be guaranteed.

Ultra-reliable and low latency communications (URLLC) services define much more stringent requirements than traditional LTE in terms of reliability and transmission latency of data transmission and reception. By these services, 5G services can be provided for industrial process automation, telemedicine, telesurgery, transportation and safety.

The massive machine-type communication (mMTC) is a service which is insensitive to the transmission delay which requires transmission of a comparatively small amount of data. With mMTC, a much larger number of terminals can access wireless access networks at the same time.

The communication unit 210 may receive dot code information from the control server 120, the terminal 130, or another robot. In the present disclosure, dot code information represents information on a plurality of dot codes disposed in a space. The dot code information may include global coordinates corresponding to each dot code, azimuth in the reference direction indicated by each dot code, and information on one or more operations corresponding to each dot code. The communication unit 210 may provide the received dot code information to the processor 270. The dot code information may be stored in the storage 280.

The input interface 220 may obtain various types of data. The input interface 220 may include at least one camera for acquiring an image signal including a still image (image) or a video, a microphone for acquiring an audio signal, and a user interface for receiving information from a user.

In an embodiment, the input interface 220 may receive the above-described dot code information through a user interface. That is, the dot code information may be inputted from the user through the input interface 220.

The input interface 220 may acquire input data to be used when obtaining output using learning data and a learning model for training the artificial neural network. The input interface 220 may obtain raw input data. In this case, the processor 270 or the learning processor 260 may extract an input feature by preprocessing the input data.

The one or more sensors 230 include an optical sensor 235. The optical sensor 235 identifies the dot code disposed at the bottom of the space and provides the identified dot code to the processor 270. The optical sensor 235 may include various sensors capable of identifying a dot code, such as an optical identification (MD) sensor and an infrared optical sensor. The optical sensor 235 may be disposed at an appropriate location for identifying the dot code disposed at the bottom of the space, such as the bottom of the robot 200. For more accurate location recognition, the optical sensor 235 may be disposed at the center part of the bottom of the robot 200.

The one or more sensors 230 may acquire at least one among internal information of the robot 200, surrounding environment information, and user information using other various sensors. The one or more sensors 230 may include an acceleration sensor, a magnetic sensor, a gyroscope sensor, an inertial sensor, a proximity sensor, an RGB sensor, an illumination sensor, a humidity sensor, a fingerprint recognition sensor, an ultrasonic sensor, an optical sensor, a microphone, a light detection and ranging (lidar) sensor, radar, or any combination thereof. The sensor data obtained by the one or more sensors 230 may be used for autonomous driving of the robot 200.

The driver 240 physically drives the robot 200. The driver 240 may include an actuator or a motor operated in accordance with a control signal from the processor 270. The driver 240 may include a wheel, a brake, and a propeller, operated by the actuator or the motor.

The output interface 250 may generate a visual, auditory, or tactile related output. The output interface 250 may include a display outputting visual information, a speaker outputting auditory information, and a haptic module outputting tactile information.

The storage 280 may store data supporting various functions of the robot 200. The memory 280 may store information or data received by the communication unit 210, and input information, input data, learning data, a learning model, and a learning history, obtained by the input interface 220. The storage 280 may include a RAM memory, a flash memory, a ROM memory, an EPROM memory, an EEPROM memory, registers or a hard disk.

In an embodiment, the storage 280 may store dot code information received from the communication unit 210 or the input interface 220. As described above, the dot code information may include global coordinates corresponding to each dot code disposed in a space, azimuth in the reference direction indicated by each dot code, and information on one or more operations corresponding to each dot code. The dot code information may be collected in advance from the control server 120 or the like and stored in the storage 280, and may be periodically updated.

The processor 270 may determine at least one executable operation of the robot 200, based on information determined or generated using a data analysis algorithm or a machine learning algorithm. In addition, the processor 270 may control components of the robot 200 to perform the determined operation.

The processor 270 may request, retrieve, receive, or use information or data of the learning processor 260 or the storage 280, and may control components of the robot 200 to execute a predicted operation or an operation determined to be preferable of the at least one executable operation. When connection with an external device such as the control server 120 and the terminal 130 is necessary to perform the determined operation, the processor 270 may generate a control signal to control the corresponding external device, and may transmit the generated control signal to the corresponding external device.

The processor 270 may control at least some of components of the robot 200, to drive an application stored in the storage 280. Furthermore, the processor 270 may operate two or more components included in the robot 200 in combination with each other to drive the application.

The processor 270 may include, for example, one or more of a Mobile Processor, an Application Processor (AP), a microprocessor, a Central Processing Unit (CPU), a Graphic Processing Unit (GPU). A Neural Processing Unit (NPU), a processor core, a multiprocessor, an Application-Specific Integrated Circuit (ASIC), or a Field Programmable Gate Array (FPGA) but is not limited thereto.

The processor 270 determines the location and direction of the robot 200 based on the dot code identified by the optical sensor 235.

In an embodiment, the processor 270 may read the pattern information of the information dots of the identified dot code, and determine the global coordinate corresponding to the read pattern information as the location of the robot 200. For this determination, the processor 270 may refer to dot code information including global coordinates corresponding to each dot code from the storage 280.

In an embodiment, the processor 270 may read the reference direction indicated by the reference dots of the identified dot code and determine the direction of the robot 200 based on the angle between the direction in which the dot code is identified and the reference direction. For this determination, the processor 270 may refer to dot code information including the azimuth of the reference direction indicated by each dot code from the storage 280.

The processor 270 may execute one or more operations corresponding to the pattern information of the identified dot code. One or more operations may include moving in the reference direction indicated by the identified dot code, outputting a predetermined guide voice, changing the settings of the robot 200, and the like. In order to identify these operations, the processor 270 may refer to dot code information including information on one or more operations corresponding to each dot code from storage 280. In order to execute the identified operations, the processor 270 may control at least one of the components of robot 200. For example, the processor 270 may move the robot 200 in a reference direction by controlling the driver 240, and output a guide voice by controlling a speaker of the output interface 250. The processor 270 may change a value of setting parameters for controlling the components of the robot 200 or an operation mode of the robot 200. The operations may be variously defined in association with the location of each dot code.

Hereinafter, the dot code used to determine the location and direction of the robot 200 will be described in detail with reference to FIGS. 3 to 10.

Figure 3:
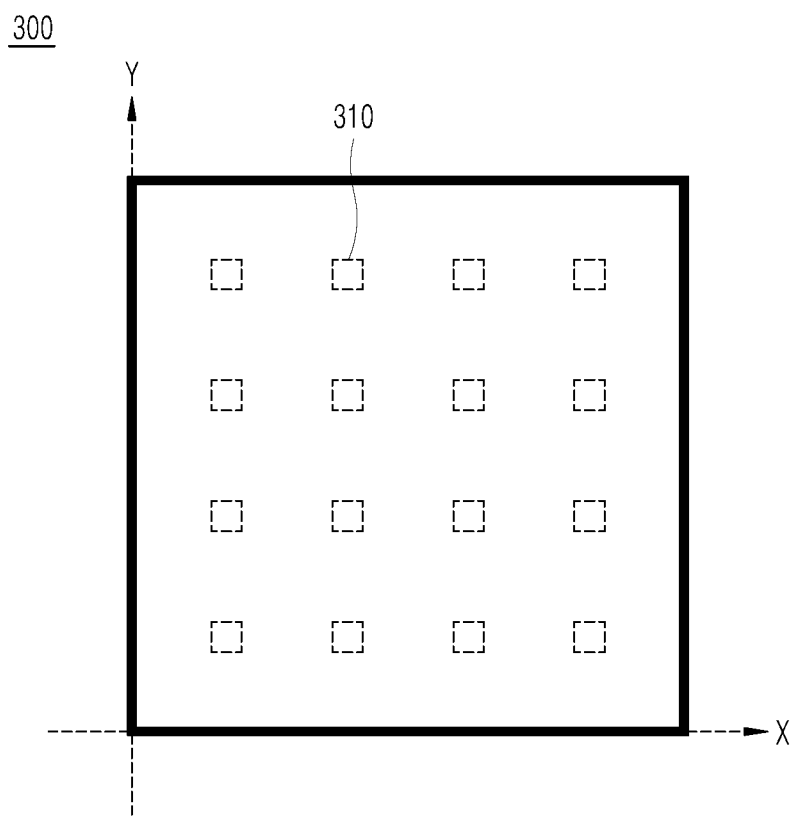
FIG. 3 is a diagram illustrating an arrangement of dot codes according to an embodiment of the present disclosure.
Figure 4:
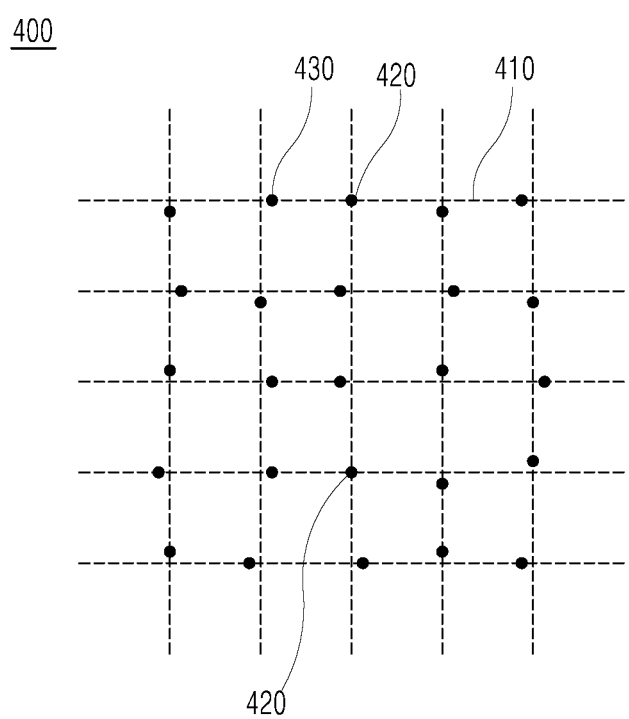
FIG. 4 is an exemplary diagram illustrating a dot code according to an embodiment of the present disclosure.

FIG. 3 is a diagram illustrating an arrangement of dot codes according to an embodiment of the present disclosure. FIG. 4 is an exemplary diagram illustrating a dot code according to an embodiment of the present disclosure. FIG. 5 is a view for explaining the dot code of FIG. 4.

A dot code represents an arrangement of fine dots. Each dot may not be visually identified. The dot code can be distinguished from other dot codes by a pattern in which dots are arranged. Different dot codes may be associated with different information respectively. The dot code can be generated by arranging a plurality of dots according to a predetermined rule by a dot code generation algorithm. The generated dot code may be printed on paper or the like and implemented as digital paper, electronic paper or paper semiconductor. The dots of the dot code can be formed using carbon ink or infrared absorbing ink.

Referring to FIG. 3, dot codes 310 printed on paper or the like may be disposed at predetermined intervals on the bottom of the space 300. Once the space 300 is mapped to the Cartesian coordinate system, each of the dot codes 310 may be associated with a corresponding two-dimensional global coordinate (x, y). Global coordinates corresponding to each dot code 310 may be stored in the storage 280 as dot code information. Although FIG. 3 illustrates that the dot codes are arranged at the same interval, the dot codes 310 may be arranged in various forms according to the characteristics of the space 300.

Referring to FIG. 4, the dot code 400 of an embodiment may include virtual grid lines 410 and a plurality of dots. The plurality of dots may include reference dots 420 and information dots 430. The reference dots 420 may be dots for indicating a reference direction of the dot code 400, and the information dots 430 may be dots for indicating pattern information of the dot code 400. Although FIG. 4 illustrates a dot code 400 including 25 dots, the number of dots, and the number and size of grids of the dot code 400 may be variously selected.

In an embodiment, the reference dots 420 may represent dots located at the intersections of the virtual grid lines 410. The reference dots 420 may indicate a reference line and a reference direction of the dot code 400. The reference line may represent a straight line connecting the reference dots 420, and the reference direction may indicate the direction of the reference line.

Figure 5A:
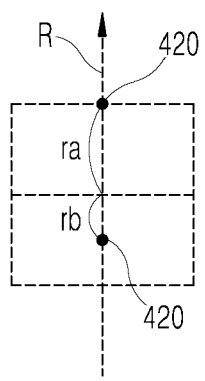
FIGS. 5A and 5B are views for explaining the dot code of FIG. 4.

Referring to FIG. 5A, a line connecting two reference dots 420 of the dot code 400 may be a reference line of the dot code 400. This reference line may represent either the first direction from the top to the bottom or the second direction from the bottom to the top. In an embodiment, the reference direction may be determined based on the distances ra and rb from the center of the reference dots 420. In FIG. 5A, the direction (i.e., the second direction) toward the upper reference dot 420 that is farther from the center (i.e., closer to the edge) may be determined as the reference direction R. Although FIG. 5 shows that the reference dots 420 are arranged in the vertical direction, the reference dots 420 may be arranged to indicate the horizontal direction or the diagonal direction. In addition, the reference dots 420 may be arranged at the edge as well as the center of the dot code 400.

In an embodiment, the information dots 430 may represent dots spaced a predetermined distance from an intersection of the virtual grid lines 410. Each information dot 430 may have a dot value based on its location with respect to the intersection of the virtual grid lines 410.

Figure 5B:
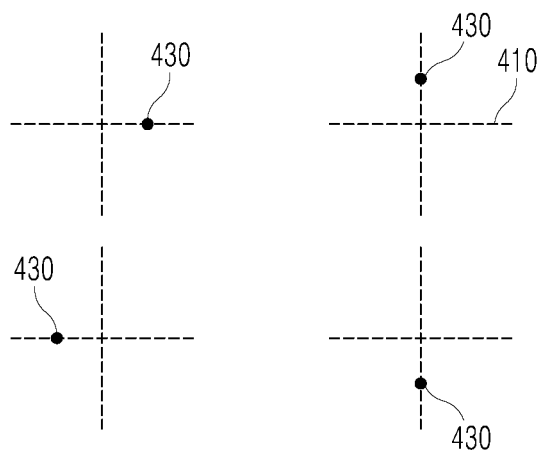

Referring to FIG. 5B, the information dot 430 may exist at four locations according to the relationship with the intersection point of the virtual grid line 410. When located on the right side of the intersection, the dot value of the information dot 430 may be "0" or binary "00", and when located at the top end of the intersection, the dot value of the information dot 430 may be "1" or binary "01". When located on the left side of the intersection, the dot value of the information dot 430 may be "2" or binary "10", and when located at the bottom end of the intersection, the dot value of the information dot 430 may be "3" or binary "11". Pattern information of the dot code 400 may be determined by dot values of the information dots 430. In another embodiment, the information dot 430 may be formed not only in the direction of the virtual grid line 410 but also in a diagonal direction thereof. In this case, the information dot 430 may have more various dot values.

Figure 6:
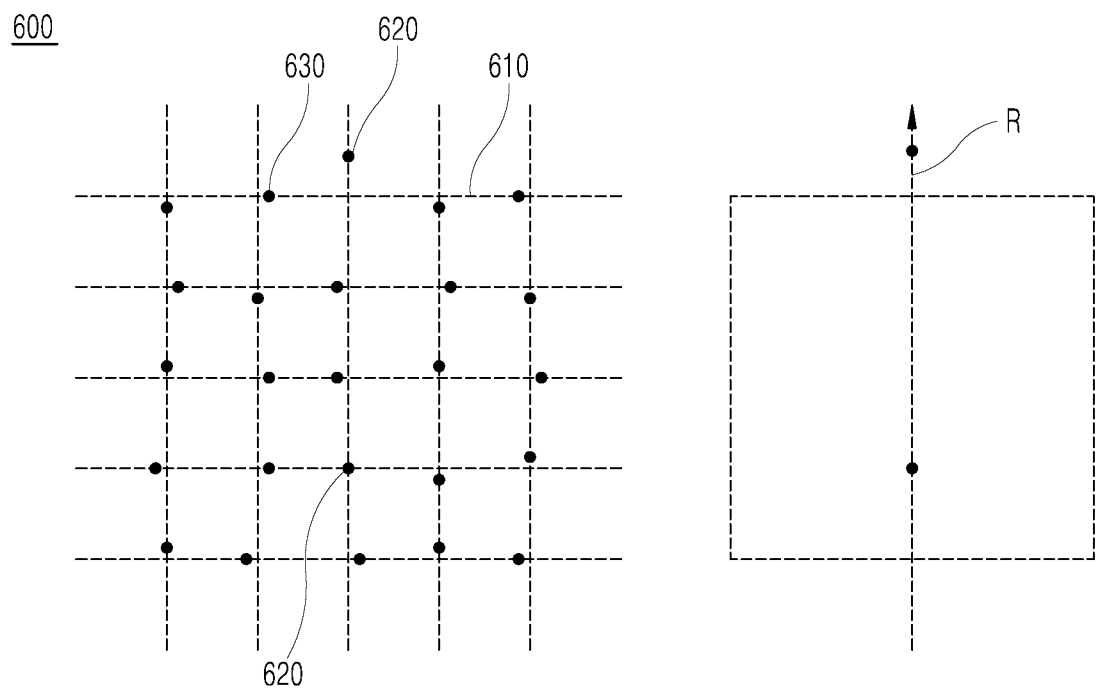
FIGS. 6 and 7 are diagrams illustrating a dot code according to another embodiment.
Figure 7:
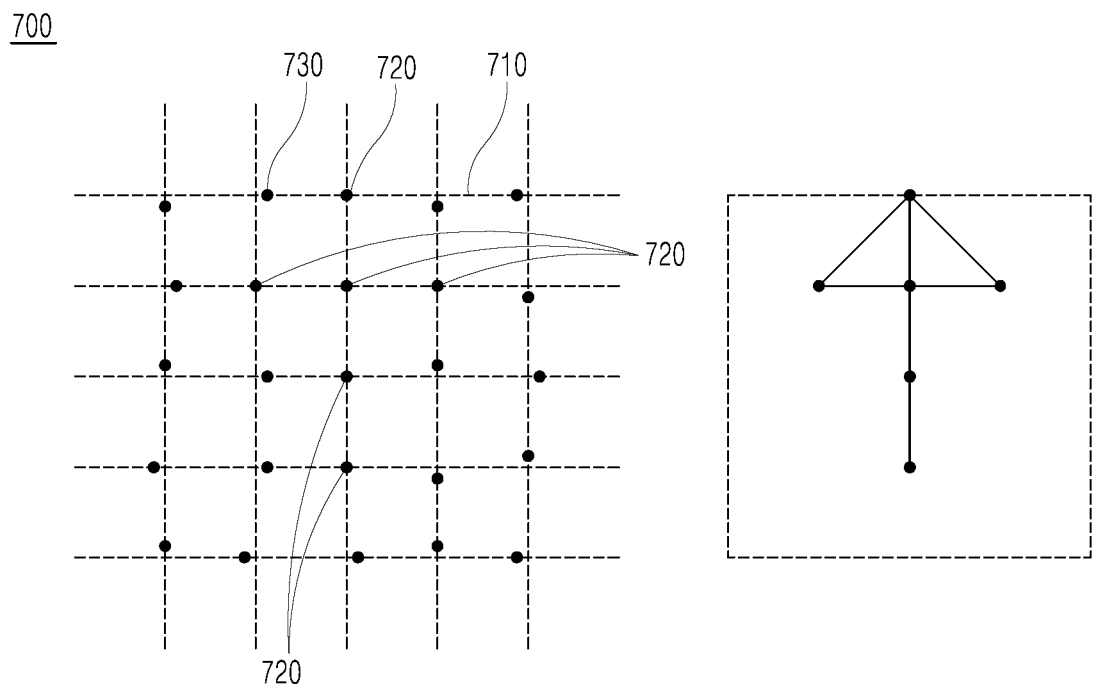

FIGS. 6 and 7 are diagrams illustrating a dot code according to another embodiment.

Referring to FIG. 6, the dot code 600 of an embodiment may include virtual grid lines 610 and a plurality of dots. The plurality of dots may include reference dots 620 and information dots 630. The reference dots 620 may be dots for indicating a reference direction of the dot code 600, and the information dots 630 may be dots for indicating pattern information of the dot code 600.

In an embodiment, at least one of the reference dots 620 may not be located at the intersection of the virtual grid lines 610. For example, in FIG. 6, the upper reference dot 620 is spaced apart from the intersection of the virtual grid lines 610. In order to distinguish from the information dots 630, the distance at which the upper reference dot 620 is spaced apart from the intersection may be different from the distance at which the information dots 630 are spaced apart from the intersection. For example, as shown in FIG. 6, the upper reference dot 620 is spaced farther from the intersection than the information dots 630.

A line connecting two reference dots 620 of the dot code 600 may be a reference line of the dot code 600. This reference line may represent either the first direction from the top to the bottom or the second direction from the bottom to the top. In FIG. 6, the direction toward the upper reference dot 620 spaced apart from the intersection may be determined as the reference direction R.

Referring to FIG. 7, the dot code 700 of an embodiment may include virtual grid lines 710 and a plurality of dots. The plurality of dots may include reference dots 720 and information dots 730. The reference dots 720 may be dots for indicating a reference direction of the dot code 700, and the information dots 730 may be dots for indicating pattern information of the dot code 700.

In an embodiment, the reference dots 720 may represent dots located at the intersections of the virtual grid lines 710, and the reference dots 720 may be arranged to form a sign indicating the reference direction. For example, in FIG. 7, the reference dots 720 may be connected with a line to represent an arrow sign. The direction indicated by the reference dots 720 may be determined as the reference direction. Although FIG. 7 illustrates an arrow sign, various signs indicating a direction may be used.

In the above embodiments, the reference dots and the information dots are distinguished based on the relationship between the dots and the intersections. However, various other ideas for distinguishing reference dots from information dots can be applied.

In an embodiment, the reference dots and the information dots can be distinguished according to the shape and/or size of the dot. The shape of the dot may include various shapes such as a circle, an oval, a polygon, and a straight line. By way of example, the reference dots may be square dots and the information dots may be circular dots. As another example, the reference dots may be dots larger in diameter than the information dots.

The dot code of FIGS. 4 to 7 is a single dot code. However, since the size of the dot code is usually very small, a group of dot codes may be repeatedly used to increase the recognition rate.

Figure 8:
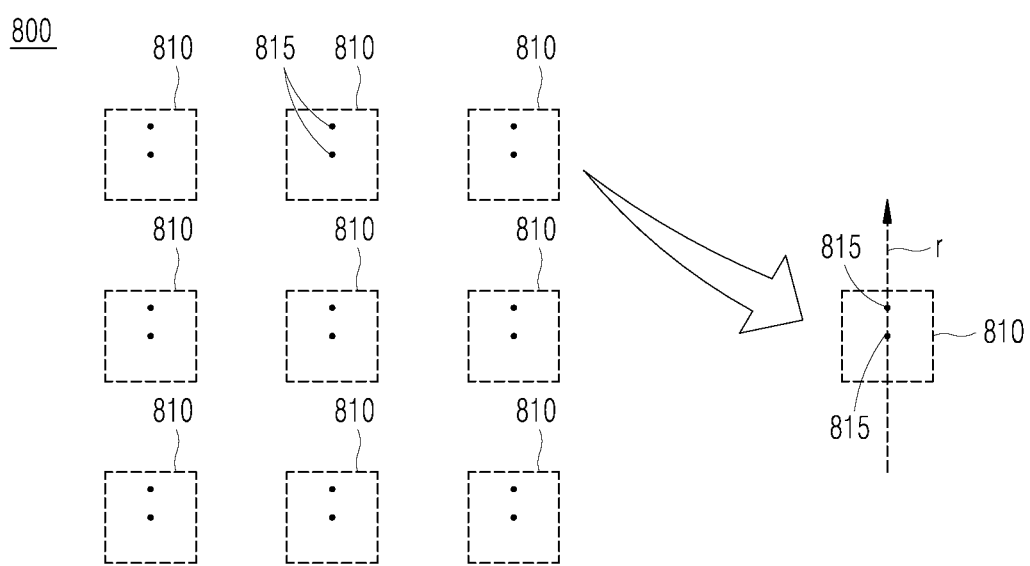
FIGS. 8 to 10 are exemplary diagrams illustrating a group of dot codes according to an embodiment of the present disclosure.
Figure 9:
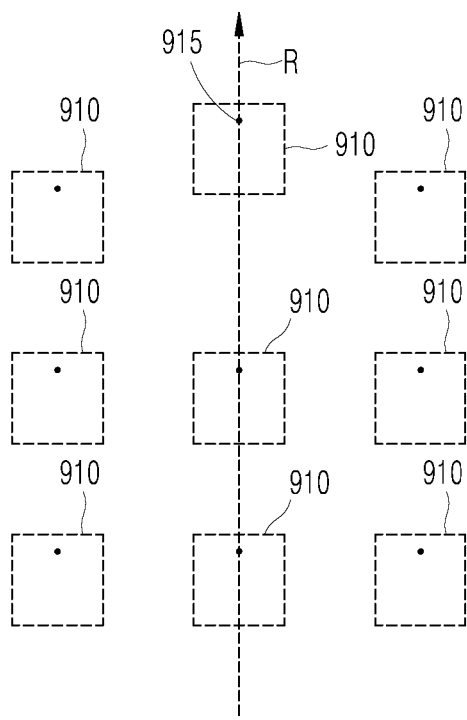
Figure 10:
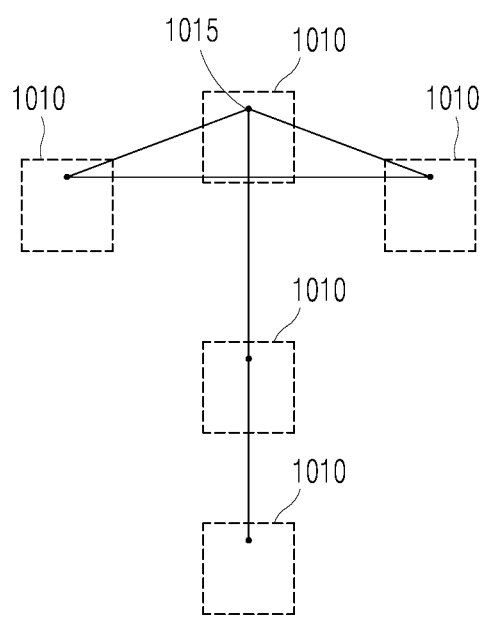

FIGS. 8 to 10 are exemplary diagrams illustrating a group of dot codes according to an embodiment of the present disclosure.

Referring to FIG. 8, the dot code 800 of an embodiment may include a group of dot codes 810. The dot patterns of the dot codes 810 in the group may all be the same. That is, the group of dot codes 810 may be associated with the same global coordinate. If only one of the dot codes 810 in the group is identified by the robot 200, the location and direction of the robot 200 may be determined, and thus, the recognition rate may be improved. Although FIG. 8 illustrates a group consisting of nine dot codes 810, the number of dot codes forming a group may be variously selected.

The reference direction of the group of dot codes 810 may be determined by the reference direction of each of the dot codes 810. In this case, the dot codes 810 should be arranged to indicate the same reference direction. Each of the dot codes 810 may include at least two reference dots 815. As described above, the reference direction r of each of the dot codes 810 may be determined by the two reference dots 815. Although FIG. 8 illustrates that the dot codes 810 in a group are aligned at predetermined intervals, the dot codes 810 may be freely arranged as long as they indicate the same reference direction.

Referring to FIG. 9, the dot code 900 of an embodiment may include a group of dot codes 910. The dot patterns of the dot codes 910 in the group may be all the same. That is, the group of dot codes 910 may be associated with the same global coordinate.

Each of the dot codes 910 in the group may include one reference dot 915. The reference dot 915 may be a reference for aligning the dot codes 910. In an embodiment, the dot codes 910 in the group may be arranged at predetermined intervals, and any one of the arranged dot codes 910 may protrude to indicate the reference direction. For example, in FIG. 9, the dot code 910 of the upper center may protrude upward, and the protruding direction may indicate a reference direction. As another example, if the dot code 910 in the right center protrudes to the right, the reference direction will be a direction toward the right. If the dot code 910 on the lower left protrudes diagonally, the reference direction will be the diagonal direction toward the lower left.

Referring to FIG. 10, the dot code 1000 of an embodiment may include a group of dot codes 1010. The dot patterns of the dot codes 1010 in the group may be all the same. That is, the group of dot codes 1010 may be associated with the same global coordinate.

Each of the dot codes 1010 in the group may include one reference dot 1015. The reference dot 1015 may be a reference for arranging the dot codes 1010. In an embodiment, the dot codes 1010 in the group may be arranged to form a sign indicating the reference direction. For example, in FIG. 10, the reference dots 1015 of the dot codes 1010 may be connected by a line to represent an arrow sign. The direction indicated by the reference dots 1015 may be determined as the reference direction. Although FIG. 10 illustrates an arrow sign, various signs indicating a direction may be used.

The above-described dot code based location recognition may be applied differently depending on whether the robot 200 correctly recognizes its current location and direction. In the present disclosure, the driving state of the robot 200 may be divided into a normal driving state and an abnormal driving state. The normal driving state refers to a state in which the robot 200 is driven while normally recognizing its current location using a conventional method. An abnormal driving state refers to a state in which the robot 200 is unable to correctly recognize its current location due to an unexpected movement, or is unable to correctly recognize its current location using a conventional method.

In one aspect, when the robot 200 is in a normal driving state, the processor 270 recognizes the current location and direction of the robot 200 based on data from the communication unit 210, the input interface 220, or the one or more sensors 300. In this case, the above-described dot code based location recognition may be used to correct the current location and direction of the robot 200. For example, if a dot code is identified during normal driving, the processor 270 may correct the current location and direction of the robot 200 based on the identified dot code. As another example, in order to correct the current location and direction of the robot 200, the processor 270 may move the robot 200 to a near dot code by controlling the driver 240.

In another aspect, when the robot 200 is in an abnormal driving state, the processor 270 may not accurately recognize the current location and direction of the robot 200. The robot 200 that does not know its location and direction does not know where to travel to identify the dot code. Thus, in order to identify the dot code, the processor 270 may control the driver 240 to move the robot 200 along the path of the predetermined pattern. The path of the predetermined pattern may be a spiral path, but is not limited thereto. The path of the predetermined pattern may include various types of paths in which the search range of the robot 200 is gradually expanded.

FIG. 11 is a view for explaining that a robot recognizes its location and direction in an abnormal driving state according to an embodiment of the present disclosure.

Figure 11A:
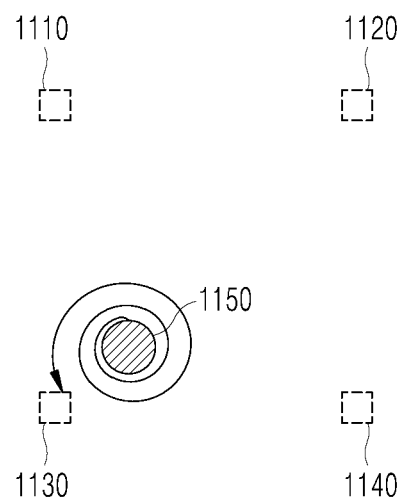
FIGS. 11A and 11B are views for explaining that a robot recognizes its location and direction in an abnormal driving state according to an embodiment of the present disclosure.

Referring to FIG. 11A, four different dot codes 1110, 1120, 1130, and 114 are disposed at the bottom of the space 1100. Each of the dot codes 1110, 1120, 1130, 114 has different pattern information and is associated with different global coordinates, respectively. The robot 1150 in an abnormal driving state may move along a spiral path to identify the dot code 1130. The robot 1150 of FIG. 11 may have the substantially same configuration as the robot 200 of FIG. 2.

Figure 11B:
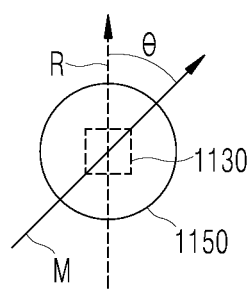

The robot 1150 may determine global coordinates corresponding to the identified dot code 1130 as its location. Also, as shown in FIG. 11B, the robot 1150 may determine its own direction based on the angle θ between the direction M in which the dot code 1130 is identified and the reference direction R of the dot code 1130. The direction in which the dot code 1130 is identified may indicate a direction in which the robot 1150 moves on the dot code 1130. The robot 1150 may refer to an azimuth of the reference direction R of the dot code 1130 from the storage 280 to determine its direction. For example, in relation to the dot code 1130, if the azimuth of the reference direction R is 90° from the x-axis, the direction of the robot 1150 may be determined to be (90-θ)° from the x-axis.

The above-described embodiments may be applied to various robot systems such as a mobile robot system, a serving robot system, a guide robot system, and a home/office robot system.

Mobile Robot System

A plurality of mobile robots of the mobile robot system may provide various services while traveling autonomously in space.

In an embodiment, the reference direction of the dot codes may point to the nearest charging station. The mobile robot can instantly recognize the direction to the nearest charging station by reading the reference direction of the dot code. Various operations based on the direction of the charging station may be defined for the corresponding dot code.

For example, an operation of moving in the reference direction may be defined. The mobile robot identifying the dot code can move toward the charging station. As another example, an operation of checking a battery level and an operation of moving to a reference direction or switching to a low power mode may be defined according to the battery level. The robot identifying the dot code may check its battery level, and then, move toward the charging station or set a low power mode depending on the battery level.

Serving Robot System

A plurality of serving robots of the serving robot system may take an order from a customer or deliver the ordered food to the customer's table.

In an embodiment, the reference direction of the dot codes may represent the basic moving line of the serving robots. The dot codes can be arranged such that their reference direction forms the basic moving line of the serving robots. In this case, the reference direction of the dot codes may indicate the next dot code on the basic moving line. In such a manner, the basic moving line of the serving robots may be determined by the dot codes. Basic moving lines can be defined in various ways to avoid structures such as tables, columns, and counters, depending on the property of the space. The robot identifying the dot code can provide services by moving along the basic moving line. If the serving robot outside the basic moving line identifies the dot code, it can easily return to the basic moving line.

In an embodiment, some dot codes may be placed adjacent to the table. An operation of outputting a guide voice may be defined for these dot codes. For example, the serving robot identifying the dot code may output a guide voice for explaining a menu to a customer or explaining food to be delivered.

Guide Robot System

A plurality of guide robots of the guide robot system may provide various guide services while accompanying the user. The guide service may include a road guide service, a docent service, a multimedia service, and the like.

In an embodiment, some dot codes may be placed in key locations for road guidance. An operation of outputting a guide voice may be defined for these dot codes. For example, the guide robot identifying the dot code may output a guide voice for explaining the corresponding location.

In another embodiment, some dot codes may be placed adjacent to a work of art, artifacts, plants, etc. in art galleries, museums, botanical gardens, and the like. An operation of outputting a guide voice may be defined for these dot codes.

As an example, the guide robot identifying the dot code may output a guide voice for explaining a corresponding work, relic or plant.

In another embodiment, an operation for outputting multimedia content may be defined for some dot codes. For example, the guide robot identifying the dot codes may play music or video.

Home/Office Robot System

A plurality of robots of the home/office robot system can provide services such as cleaning at home or at work.

In an embodiment, some dot codes may be placed at the entry point of a particular space. For such dot codes, an operation of changing the setting of the robot may be defined. For example, the robot identifying the dot code while entering the conference room may change its setting to the silent mode.

Figure 12:
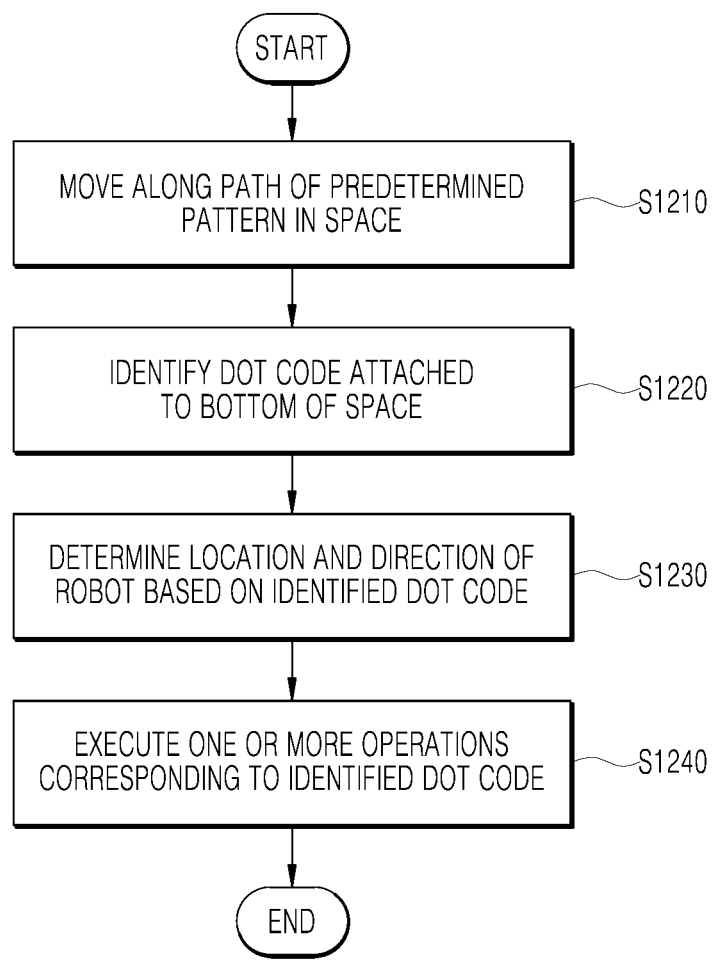
FIG. 12 is a flowchart illustrating a method for recognizing a location of a robot according to an embodiment of the present disclosure.

FIG. 12 is a flowchart illustrating a method for recognizing a location of a robot according to an embodiment of the present disclosure. The method, illustrated in FIG. 12, may be performed by the robot 200 of FIG. 2.

In step S1210, the robot 200 may move along a path of a predetermined pattern in space. The path of the predetermined pattern may be a spiral path. Step S1210 may be performed by the robot 200 in an abnormal driving state. When the robot 200 is in a normal driving state, step S1210 may be omitted.

In step S1220, the robot 200 identifies the dot code arranged at the bottom of the space. The robot 200 may identify the dot code through the optical sensor 235.

In step S1230, the robot 200 determines the location and direction of the robot 200 based on the identified dot code. The robot 200 may determine global coordinates corresponding to the pattern information of the identified dot code as its location. Also, the robot 200 may determine its own direction based on an angle between the direction in which the dot code is identified and the reference direction of the dot code. In order to determine the location and direction, the robot 200 may refer to dot code information stored in the storage 280. The dot code information may include information on global coordinates corresponding to each dot code and an azimuth of the reference direction indicated by each dot code.

In step S1240, the robot 200 may execute one or more operations corresponding to the identified dot code. One or more operations may include moving in a reference direction, outputting a preset guide voice, or changing a setting of the robot. The robot 200 may refer to dot code information stored in the storage 280. The dot code information may include information on one or more operations corresponding to each dot code. If there is no operation corresponding to the identified dot code, step S1240 can be omitted.

Meanwhile, referring to FIG. 2 again, in an embodiment, the robot 200 may further include a learning processor 260 to perform an operation related to artificial intelligence and/or machine learning.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The learning processor 260 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion.

The learning processor 260 may train the artificial neural network using various patterns of reference dots and information dots of dot codes as learning data.

In an embodiment, the learning processor 260 uses various patterns of reference dots and information dots of dot codes as learning data so that it may train the artificial neural network to output the reference direction indicated by the corresponding dot code.

In an embodiment, the learning processor 260 may use the identified dot codes as input data for the learning model based on the artificial neural network to determine the reference direction indicated by the corresponding dot code.

Figure 13:
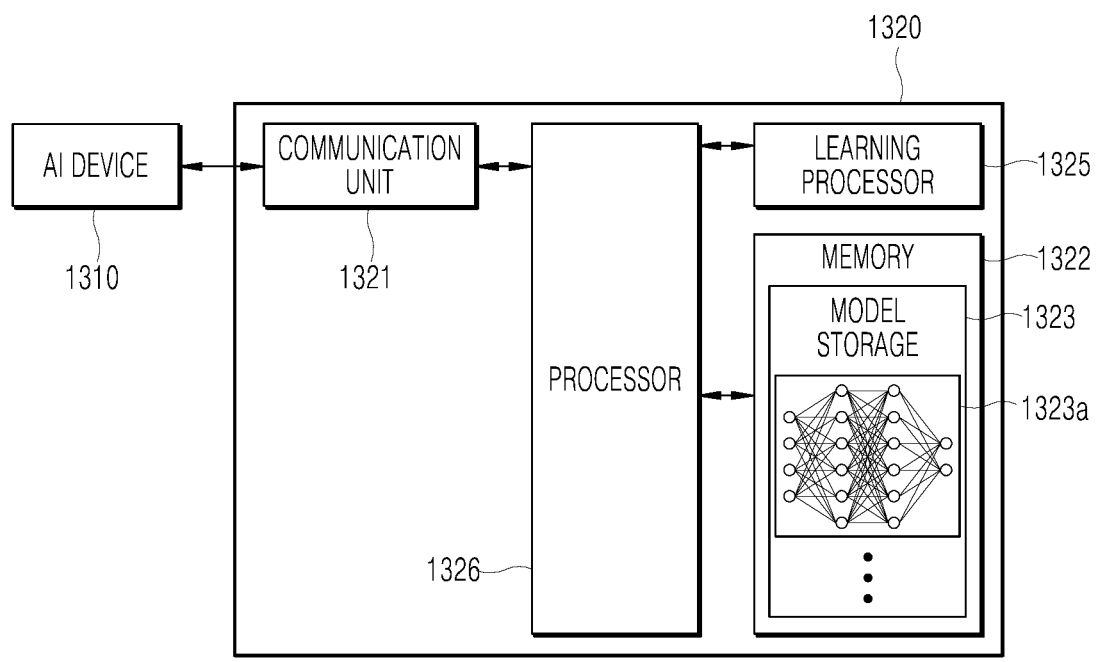
FIG. 13 is a view illustrating a robot system according to another embodiment of the present disclosure.

The learning processor 260 may perform artificial intelligence and/or machine learning processing together with a learning processor 1325 of an AI server 1320 of FIG. 13. The learning processor 260 may include a memory integrated or implemented in the robot 200. Alternatively, the learning processor 260 may be implemented using the storage 280, an external memory directly coupled to the robot 200, or a memory maintained in an external device.

FIG. 13 is a view illustrating a robot system according to further another embodiment of the present disclosure. In an embodiment, a robot system may be implemented as an AI system capable of performing artificial intelligence and/or machine learning. Referring to FIG. 13, a robot system according to another embodiment of the present disclosure may include an AI device 1310 and an AI server 1320.

In an embodiment, the AI device 1310 may be the robot 110 of FIG. 1, the control server 120, the terminal 130, or the robot 200 of FIG. 2. The AI server 1320 may be the control server 120 of FIG. 1.

The AI server 1320 may refer to a device training an artificial neural network using a machine learning algorithm or using a trained artificial neural network. The AI server 1320 may be composed of a plurality of servers to perform distributed processing. The AI server 1320 is included as a configuration of a portion of the AI device 1310, and may perform at least a portion of the artificial intelligence and/or machine learning processing.

The AI server 1320 may include a communication unit 1321, a memory 1322, a learning processor 1325, and a processor 1326.

The communication unit 1321 may transmit and receive data with an external device such as the AI device 1310.

The memory 1322 may include a model storage 1323. The model storage 1323 may store a model (or an artificial neural network 1323a) learning or learned through the learning processor 1325.

The learning processor 1325 may train the artificial neural network 1323a using learning data. The learning model may be used while mounted in the AI server 1320 of the artificial neural network, or may be used while mounted in an external device such as the AI device 1310.

The learning model may be implemented as hardware, software, or a combination of hardware and software. When a portion or the entirety of the learning model is implemented as software, one or more instructions, which constitute the learning model, may be stored in the memory 1322.

The processor 1326 may infer a result value with respect to new input data by using the learning model, and generate a response or control command based on the inferred result value.

The example embodiments described above may be implemented through computer programs executable through various components on a computer, and such computer programs may be recorded on computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is not limited to the example embodiments described above, and rather intended to include the following appended claims, and all modifications, equivalents, and alternatives falling within the spirit and scope of the following claims.

What is claimed is:

1. A method for localization of a robot, the method comprising:
    moving in space;
    identifying a dot code disposed at a bottom of the space; and
    determining a location and direction of the robot based on the identified dot code,
    wherein the dot code comprises at least two reference dots arranged to indicate a reference direction,
    wherein the determining of the location and direction of the robot comprises:
        determining coordinates corresponding to pattern information of the identified dot code as a location of the robot; and
        determining a direction of the robot based on an angle between a direction in which the dot code is identified and the reference direction.

2. The method of claim 1, further comprising, in response to identifying the dot code, executing one or more operations corresponding to the pattern information of the identified dot code.

3. The method of claim 2, wherein the one or more operations comprise at least one of moving in the reference direction, outputting a preset guide voice, or changing a setting of the robot.

4. The method of claim 1, wherein the reference direction indicates a location of a charging station.

5. The method of claim 1, wherein the moving in the space comprises moving along a path of a predetermined pattern to identify the dot code.

6. The method of claim 5, wherein the path of the predetermined pattern comprises a spiral path.

7. The method of claim 1, wherein the at least two reference dots are arranged to form a sign indicating the reference direction.

8. The method of claim 1, wherein the dot code is composed of a group of identical dot codes corresponding to the same coordinates.

9. The method of claim 8, wherein at least one of the dot codes in the group protrudes toward the reference direction.

10. The method of claim 8, wherein the dot codes in the group are arranged to form a sign indicating the reference direction.

11. A robot comprising:
- a driver configured to move the robot in space;
- an optical sensor configured to identify a dot code disposed at a bottom of the space; and
- at least one processor configured to determine a location and direction of the robot based on a dot code identified by the optical sensor,
- wherein the dot code comprises at least two reference dots arranged to indicate a reference direction,
- wherein the at least one processor is further configured to:
  - determine coordinates corresponding to pattern information of the identified dot code as a location of the robot, and
  - determine a direction of the robot based on an angle between a direction in which the dot code is identified and the reference direction.

12. The robot of claim 11, wherein the at least one processor is further configured to execute one or more operations corresponding to the pattern information of the identified dot code in response to identifying the dot code,
- wherein the one or more operations comprise at least one of moving in the reference direction, outputting a preset guide voice, or changing a setting of the robot.

13. The robot of claim 11, wherein the at least one processor is further configured to control the driver to move the robot along a path of a predetermined pattern to identify the dot code.

14. The robot of claim 13, wherein the path of the predetermined pattern comprises a spiral path.

15. A robot system comprising:
- a plurality of different dot codes disposed at a bottom of a space; and
- at least one robot configured to provide a service in the space,
- wherein the at least one robot is configured to identify any one dot code among the plurality of dot codes, determine its location and direction based on the identified dot code, and provide the service based on the determined location and direction,
- wherein each of the dot codes comprises at least two reference dots arranged to indicate a reference direction,
- wherein the at least one robot is further configured to:
  - determine coordinates corresponding to pattern information of the identified dot code as its location, and
  - determine its direction based on an angle between a direction in which the dot code is identified and the reference direction.

16. The robot system of claim 15, wherein the at least one robot is further configured to execute one or more operations corresponding to the pattern information of the identified dot code in response to identifying the dot code,
- wherein the one or more operations comprise at least one of moving in the reference direction, outputting a preset guide voice, or changing its setting.

17. The robot system of claim 15, wherein the reference direction indicates a location of a charging station.

* * * * *